United States Patent

[11] 3,633,747

[72] Inventor William L. Fismer
 Verona, N.J.
[21] Appl. No. 31,174
[22] Filed Apr. 23, 1970
[45] Patented Jan. 11, 1972
[73] Assignee T. Shriver & Company, Inc.
 Harrison, N.J.

[54] FILTER PRESS METHOD AND APPARATUS
 10 Claims, 4 Drawing Figs.
[52] U.S. Cl.................................................. 210/81,
 210/225
[51] Int. Cl...................................................... B01d 23/24
[50] Field of Search............................................ 210/81, 82,
 224–231, 141, 142, 393, 410; 100/198, 199

[56] References Cited
 UNITED STATES PATENTS
 3,347,383 11/1965 Augerot ....................... 210/225
 3,390,772 7/1968 Juhasz.......................... 210/225 X

*Primary Examiner*—Samih N. Zaharna
*Assistant Examiner*—T. A. Granger
*Attorney*—Curtis, Morris & Safford ABSTRACT: A filter press with a plurality of filter plates mounted in side-by-side relationship and method and apparatus for cleaning the cake from the plates. The cake is formed upon the opposed side faces of the plates, and each of the side faces is covered by fabric. The fabric is flexed away from the plate by pressurized air which is introduced between the plate and the fabric to remove the cakes. Each plate has an operating unit formed by an air valve for controlling airflow into the plate, a rotatably mounted valve-actuator arm and a pair of abutment members adjacent the opposed top edges of the plate. When removing the cakes the plates are moved sequentially, away from the stack and laterally in the press. During the initial movement of each plate one of the abutment members on an adjacent plate engages and swings the actuator arm of the moving plate so as to open its valve, and the cakes are removed. The cleaned plate is then moved on, and an abutment member on the opposed adjacent plate engages the actuator arm for closing the valve.

PATENTED JAN 11 1972

INVENTOR
WILLIAM L. FISMER
BY
Curtis, Morris & Safford
Attorneys

FILTER PRESS METHOD AND APPARATUS

This invention relates to improvements in filter presses, and more particularly to methods and apparatus for controlling airflow through the filter plates during removal of the filter cake and cleaning of the filter fabric.

Filter presses are generally used to remove solid particles from liquids. One such press is disclosed in Augerot, U.S. Pat. No. 3,347,383, which disclosure is incorporated herein by reference. Substantially, that patent describes filter presses having filter plates with opposed filter cloth surfaces arranged in side-by-side relation for filtering solids containing material across the filter plate cloths and for discharging the filtrate from the zone between the cloths on each plate. As the filtration process continues filter cakes form on the filter cloth surface on each side of each of the plates. The cakes are removed by charging the zone between each cloth and its plate with pressurized air to flex the cloth away from the plate and detach the cake. For this process to be performed the plates must be separated and shifted in the press so that adjacent cloths are free to flex.

It is an object of this invention to provide a method and apparatus which automatically controls the flow of air to the filter plates during the cleaning operation. It is another object to provide for sequential cleaning of filter plates in a filter press. A further object is to synchronize the shifting of plates during a cleaning process utilizing a pneumatic cake discharge or cleaning system. Another object is to provide a completely automatic filtering and cleaning process. It is a further object of the invention to provide a relatively simple and inexpensive apparatus for cleaning filter plates having flexible fabric sidewalls.

The construction of the preferred embodiment as well as further objects and advantages thereof will become further apparent from the following specification when considered in conjunction with the accompanying drawings wherein.

Figure 1:
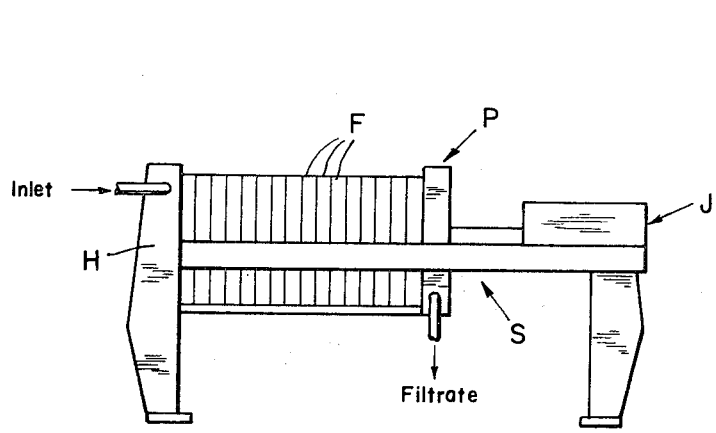
FIG. 1 is a schematic illustration of the filter press of the present invention with the sequential valve system removed.

Referring now to the drawings, and in particular to FIG. 1 there is schematically illustrated a filter press having a fixed head H mounted on a supporting frame S which carries a series of filter plates F in side-by-side relation and which can be clamped together by means of a movable head P also carried by the frame. Head P is actuated by means of a hydraulic or pneumatic jack J to press and hold the plates in tight face-to-face and leakproof relation. The plates are separated during the cleaning process either manually, after the retraction of movable head P, or preferably, by means of an automatic plate shifting device of a known type.

Figure 2:
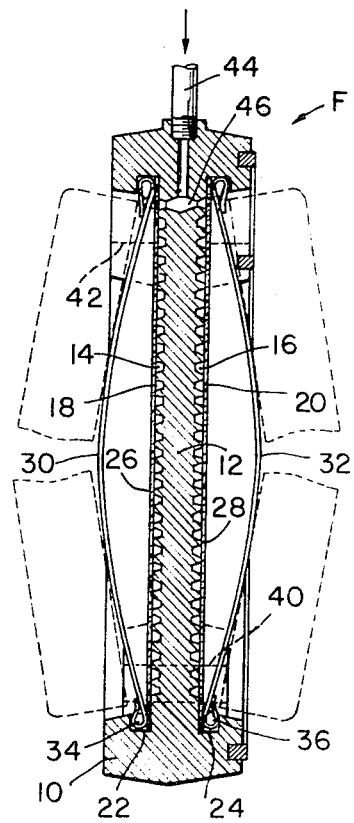
FIG. 2 is a sectional side view of one of the plates in the filter press of FIG. 1.

The filter plates used in the preferred embodiment of this invention are similar to those described in U.S. Pat. No. 3,347,383 and one such plate is illustrated in section in FIG. 2. This plate is described in some detail herein to facilitate a full understanding of the present invention.

Each plate F includes an outer frame 10 and an inner partition plate 12 which are integrally cast. Plate 12 has a plurality of communicating grooves 14 and 16 on its opposite faces 18 and 20 respectively. Internal peripheral grooves 22 and 24 are machines in the sides of frame 10 on opposite sides of partition plate 12 to receive screens 26 and 28 for supporting filter clothes 30 and 32 respectively. As illustrated, the filter cloths have ropelike gaskets 34 and 36 sewn in their edges and they are of such dimensions that they are snugly received and held in grooves 22 and 24. Thus, the cloths are held tightly so that the air pressure used for discharging the cake will not blow the cloths out of the frame. The plate and filter cloths are generally rectangularly shaped and each plate frame includes a pair of inlet ports 40 and a pair of outlet ports 42. These ports are located in diagonally opposed upper and lower corners of the plate and thus only one of each type is seen in the sectional view of FIG. 2.

Inlet ports 40 are formed in cast portions of less width than frame 10 so that liquid can readily flow from the inlet pipe (FIG. 1) through ports 40 and against the outer surfaces of cloths 30 and 32 into grooves 14 and 16 of plate 12. Discharge ports 42 are formed in cast portions of approximately the same width as frame 10 and thus the adjacent discharge passages in the various plates form a continuous discharge conduit. Grooves 14 and 16 communicate with discharge passages 42 for removal of the filtered liquid from between cloths 30 and 32.

Solids in the liquid form in layers or cakes on the cloths. When the recesses between filter plates F are filled with solids, or when the flow rate is reduced to the minimum rate, valves (not shown) controlling the fluid flow are closed to stop the filtering operation. The plates are sequentially moved apart manually or automatically, starting at the plate at the right in FIG. 1. Compressed air is then introduced through the inlet pipe 44 (FIG. 2) of that plate which is connected with an inverted T-passageway 46 for supplying air pressure behind filter cloths 30 and 32. The introduction of compressed air in this manner into plates 10 causes cloths 30 and 32 to bow or billow outwardly as shown in broken lines in FIG. 2, thereby peeling or stripping the filter cake from the cloths.

Figure 4:
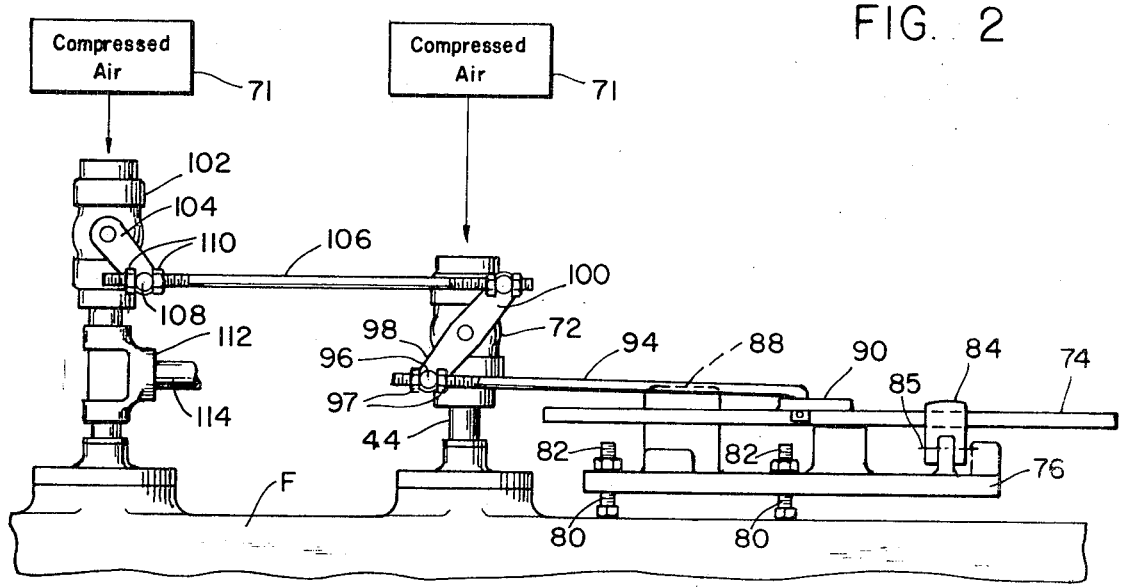
FIG. 4 is a view taken along line 4—4 of FIG. 3 of the top of an end filter plate.
Figure 3:
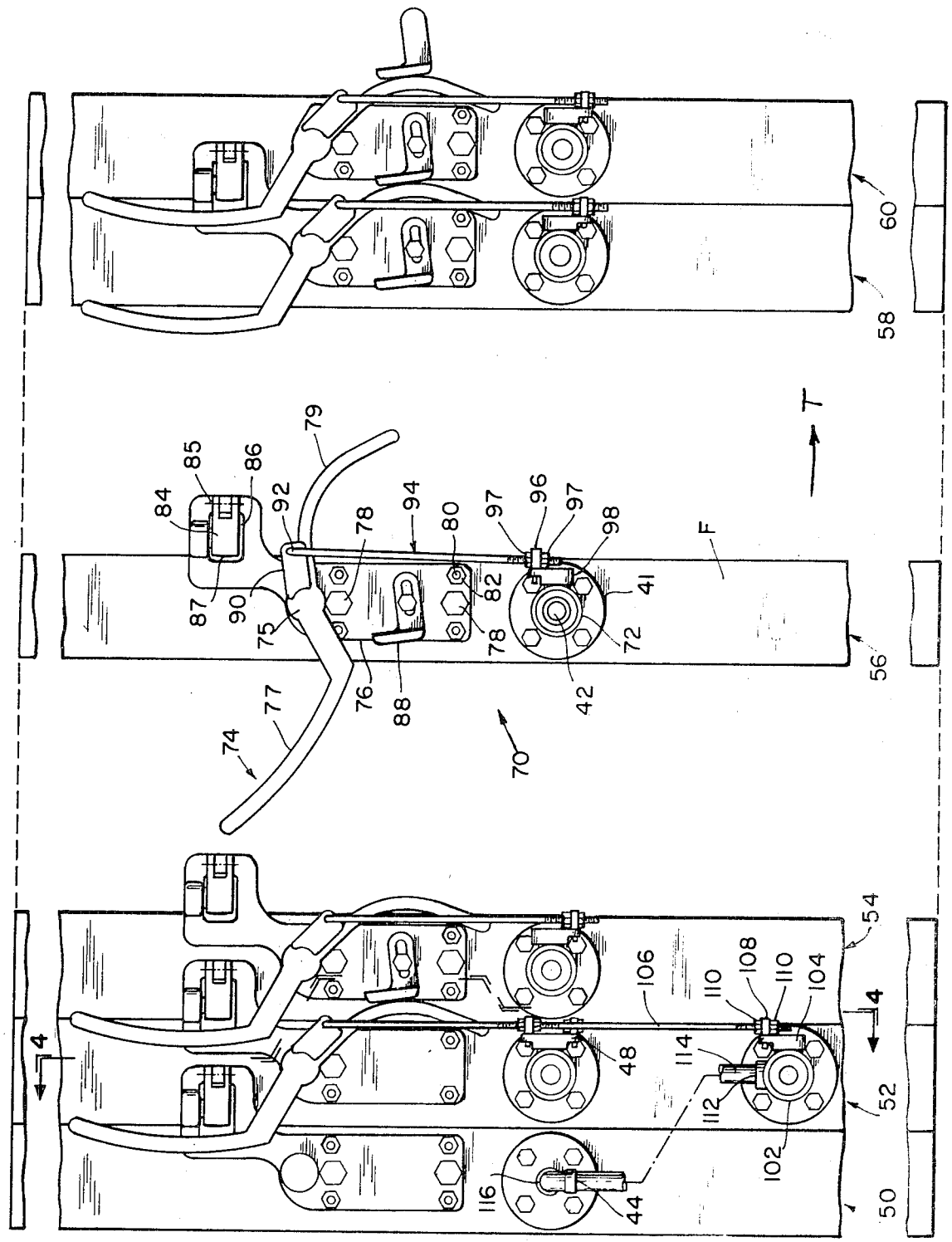
FIG. 3 is a top plan view with parts broken away of the press of FIG. 1, during the cleaning cycle.

The apparatus illustrated in FIGS. 3 and 4 is provided to automatically control the airflow into each of the plates F during the cleaning process. As each plate is moved laterally in the press, compressed air is supplied to it and the air is then shut off at the end of the lateral movement.

Particularly, in FIG. 3, six filter plates 50, 52, 54, 56, 58 and 60 are partially illustrated as they would appear in a top view of filter press P during the filter cleaning process. The plates are moved sequentially in the direction indicated by the arrow T, one at a time, and the introduction of air into each plate occurs as the plate is being shifted. Accordingly, in the situation illustrated, plates 60 and 58 have been cleaned, plate 56 is in the process of being cleaned and the remaining plates are not yet cleaned.

A control unit 70 is provided on each plate F to control the flow of compressed air from a source 71 thereof (which is represented schematically) to pipe 44 of each of plates F. Control unit 70 includes ball valve 72 and valve linkage actuator arm 74 operatively connected to the valve. The control system 70 is the same for each plate and thus only one such system is described in detail.

Actuator arm 74 is generally "S" shaped and is pivotally mounted at its center 75 on baseplate 76. Baseplate 76 is mounted on plate F by a pair of hold down bolts 78 and is leveled by four jackscrews 80 with jam nuts 82. At one end of baseplate 76 a spring loaded pawl 84 is provided which extends beyond the right side of plate F in the direction of travel thereof. Pawl 84 is wedge shaped and pivotally mounted on axis 85 whereby it may be depressed through the aperture 86 in plate 76. As seen in FIG. 3, pawl 84 on plate 52 is engaged with one leg 77 of arm 74 of adjacent plate 54 and serves to effect rotation of arm 74 as plate 54 is moved in the direction of travel.

Baseplate 76 is also provided with a stop member 88 adjacent the side of plate F opposite from pawl 84. This stop member is located between the two hold down bolts 78 and engages the other leg 79 of actuator arm 74. As the lateral shifting movement continues, leg 79 of the actuator arm on plate 56 will engage stop 88 of adjacent plate 58 to counter rotate arm 74. In addition, as plate 56 moves to its final position adjacent plate 58, leg 77 of the actuator arm on plate 58 will depress wedge shaped pawl 84 on plate 56 until it has passed completely over the pawl. Due to the spring loading of pawl 84, it will then move back to its normal configuration and in this manner be prepared for the next cleaning operation.

Rotation of valve actuator arm 74, as described above, controls airflow through ball valve 72. Crank arm 90 is fixed to arm 77 and connecting rod 94 is rotatably connected at one end to crank 90 at a point 92 off its center of rotation. The opposed end of connecting rod 94 is pivotally attached by connector link 96 to the operating crank arm 98 of valve 72. In this manner the angular motion of arm 74 is transmitted by connecting rod 94 to crank 98 of valve 72. Crank 98 is secured to the stem of valve 72 and as actuator arm 74 is rotated by engagement with an adjacent pawl 84, connecting rod 94 imparts this motion upon crank 98 causing the valve to open and admit a pulse of compressed air. Conversely, as arm 74 is rotated to its original position by engagement with an adjacent stop 88, the connecting rod pushes valve crank arm 98 to close valve 72 and shut off the air pulse.

The end of connecting rod 94 fixed to link 96 is threaded, and extends through a bore in the link. A pair of nuts 97 threaded on rod 94 on opposite sides of link 96 permit axial adjustment of rod 94 and the specific angular relation between the various elements.

The intermediate plates in press P each have the same actuator system 70, however, the plates at each end of the row are slightly modified since they do not have an adjacent plate on each side. Thus the first plate cleaned, plate 60, does not require pawl 86 to actuate an adjacent plate and therefore the pawl is eliminated.

Since there is no plate to the left of head liner plate 50, i.e., the last plate to be cleaned, this plate does not require a stop member and in addition, cannot have an actuator arm since there is no adjacent pawl to engage with. Accordingly, the next to last plate to be cleaned, plate 52, utilizes an additional crank arm 100 on its valve 72 so that the motion of its connecting rod 94 may also be utilized to control airflow into plate 50. This result is achieved by providing a second valve 102 having crank arm 104 connected to the stem of the valve for operative control thereof. In addition, second connecting rod 106 is pivotally secured at each end to cranks 100 and 104, respectively. As seen in FIG. 4 these pivotal connections are formed by connector links 108 and nuts 110 threaded on rod 106 in a manner similar to that described above with respect to link 96. In this manner, as valve 72 on plate 52 is opened and closed by its arm 74, valve 102 will be similarly opened and closed.

Air flows through valve 102 through fitting 112 and flexible hose 114 to a second elbow fitting 116 which communicates with grooves 14 and 16 in a manner similar to that discussed above with respect to pipe 44. Accordingly, head liner plate 50 is cleaned simultaneously with plate 52 as the latter is moved laterally in press P. In addition it is noted that since plate 50 does not have an actuator arm, plate 52 also does not require a stop 88.

It is thus seen that as a typical plate, i.e., plate 56, is initially moved in the cleaning process, its actuator arm 74 contacts the vertical surface 87 of pawl 84 on plate 54, causing arm 74 to rotate counterclockwise. Arm 74 is rotated during its lateral movement far enough to slip by pawl 84 and cause connecting rod 94 to rotate crank 98 and open valve 72, thus permitting airflow through pipe 44 between cloths 30 and 32. Airflow continues until plate 56 is moved far enough to the right so that leg 79 of arm 74 engages stop 88 on plate 58. As plate 56 moves further to the right, the edge of leg 79 slides against stop 88 and causes arm 74 to rotate clockwise, thus shutting off the flow of air to plate 56. When the pawl 84 touches actuator arm 74 on plate 58, the arm rides up over inclined top surface 89 of the pawl and depresses it against its spring load. Thus arm 74 passes over the pawl and then the spring returns the pawl to its original position.

The above description of the invention is intended to be illustrative only, and various changes and modifications in the embodiments described may occur to those skilled in the art. These may be made without departing from the scope of the invention and thus it should be apparent that the invention is not limited to the specific embodiments illustrated in the drawings.

What is claimed is:

1. In a sequentially operated valve control system for use in carrying on a filter plate cleaning process wherein each plate has a pair of flexible fabric covers positioned respectively upon its sidewalls and is moved from a first position adjacent other plates in the filter plate stack to a second position in which it is separated from the other plates and the plate is cleaned and thence to a third position, the combination of separate valve means for each plate for controlling the entrance of pressurized air into the zones between the plate and its flexible fabric covers, valve actuator means associated with each of said valve means, and means mounted to move with each plate and to sequentially operate the valve actuator means of adjacent plates to open and close their associated valve means during movement from said first to second positions.

2. A sequentially operated valve control system for use in carrying on a filter plate cleaning process wherein each plate has a pair of flexible fabric covers positioned respectively upon its sidewalls and is moved from a first position adjacent other plates in the filter plate stack to a second position in which it is separated from the other plates and the plate is cleaned and thence to a third position, comprising a plurality of filter plates, an air valve mounted upon each of said plates adapted to control the flow of pressurized air to its plate between each of the fabric covers and the adjacent sidewalls, rotatable actuator means on each of said plates for sequentially operating said valves, said apparatus including means for rotating said actuator means to open the valve for each plate when that plate is moved from said first position to said second position, said apparatus also including means to rotate said actuator means to close the valve of each plate while in said second position prior to movement of the next adjacent plate in the stock from said first position.

3. An apparatus for controlling airflow to the interior of filter plates having flexible fabric sidewalls defining first and second sides, during the lateral movement of the plates in a filter cleaning process, comprising, valve means mounted on each plate for controlling the introduction of air into its associated plate, valve control apparatus on each of said plates including, a rotatably mounted actuator arm, means operatively connected to said valve and said arm for opening and closing the valve in response to arm rotation, abutment means for effecting rotation of the actuator arm on the filter plate adjacent a plate's first side and stop means for effecting counter rotation of the actuator arm on the filter plate adjacent a plate's second side whereby as a plate is moved laterally in the cleaning process its actuator arm is initially rotated by the abutment means on the filter plate adjacent its second side to open the valve and at the end of its movement its actuator arm is counter rotated by the stop means on the filter plate adjacent its first side to close the valve.

4. The apparatus as defined in claim 3 wherein said actuator arm forms a substantially S-shaped member rotatably mounted at its center on its associated filter plate and said abutment means comprises a spring loaded pawl extending beyond the first side of the plate on which it is mounted whereby, as each of said plates comes to rest at the end of said lateral movement said pawl is contacted by the first leg of the actuator mounted on the plate adjacent its first side and depressed to permit the leg to pass thereover.

5. The control system of claim 4 wherein said valve means comprises a ball valve having rotatable control arm and said actuator arm includes a connecting rod pivotably connected at one end to said arm eccentrically of its center of rotation and pivotably connected at its other end to said valve control arm whereby rotation of the actuator arm effects rotation of the valve control arm to open and close the valve.

6. An automatic valve control system for use on filter plates, having flexible fabric filters on opposed sides thereof, during a cleaning process wherein a plurality of such plates are positioned adjacent each other in a starting position and individual plates are moved laterally from the starting position to a final position while air is introduced between the fabric filters to flex the filters and remove filtrate cakes therefrom, comprising, an air valve on each of said filter plates, an actuator means rotatably mounted on each of said filter plates for opening the valve on initiation of lateral movement, means on one side of each of said filter plates for engaging the actuator means of the filter plate adjacent said one side whereby as said adjacent plate is moved laterally said actuator means is rotated to open said valve and admit air between the fabric filters, and stop means on the other side of each of said filter plates for contacting the actuator means of the filter plate adjacent said other side at the end of its lateral movement whereby said actuator means is rotated in an opposite direction to close the valve.

7. An automatic valve control system for use on a plurality of adjacent filter plates having flexible fabric filters, in a cleaning process wherein each plate is moved laterally and charged with air through a control valve thereon during movement to flex the fabric filters and remove filtrate cakes therefrom, comprising, a generally S-shaped actuator member rotatably mounted at its center on each of said plates and defining an upper and lower arm, a pivoted pawl member mounted on each plate in a location wherein it is adapted to be engaged by the upper arm of the actuator on the filter plate immediately to its right, a stop means mounted on each of said plates in a position wherein it is adapted to be engaged by the lower arm of the actuator on the filter plate immediately to its left and means operatively connected between said actuator and said valve for operating said valve in response to pivotal movement of the actuator arm, wherein the initial lateral movement of a plate during the cleaning process causes the upper arm of its associated actuator means to contact the pawl on the immediately adjacent plate to its left, to pivot the actuator and open the valve and continued movement of the plate causes the lower arm of its actuator to contact the stop means on the immediately adjacent plate to its right, to close the valve.

8. A method of cleaning filter plates having flexible fabric filters on opposed sides thereof, comprising, the steps of moving said plates sequentially from a first to a second position in a filter press, introducing a flow of compressed air into a plate to be cleaned between its fabric sides, on the initiation of movement thereof, and shutting off said flow of compressed air when said plate being cleaned reaches said second position.

9. The method as described in claim 8 including the step of maintaining said flow of air during movement of said plates from said first to second positions.

10. A method of cleaning filter plates having flexible fabric filters on opposed sides thereof, comprising, the steps of, moving said plates sequentially from a first to a second position in a filter press, automatically and sequentially operating a valve member on each of said plates for introducing a flow of compressed air from a source thereof, into said plates between said fabric filters upon initiation of movement of an individual plate away from said first position, maintaining said valve in an open position during movement of said individual plate towards said second position, and automatically operating said valve to shut off said flow of compressed air as said individual plate moves into said second position.

* * * * *